United States Patent [19]

Mizutani et al.

[11] 4,219,876

[45] Aug. 26, 1980

[54] COMPUTED TOMOGRAPHY USING RADIATION

[75] Inventors: Hiroyuki Mizutani, Yokohama; Toshio Uehara, Tokyo, both of Japan

[73] Assignee: Tokyo Shibaura Electric Co., Ltd., Japan

[21] Appl. No.: 915,540

[22] Filed: Jun. 14, 1978

[30] Foreign Application Priority Data

Jun. 14, 1977 [JP] Japan .................................. 52-69398

[51] Int. Cl.² ........................................ G01M 23/00
[52] U.S. Cl. ................................ 364/414; 250/445 T
[58] Field of Search ............................... 364/414, 415; 250/445 R, 445 T

[56] References Cited

U.S. PATENT DOCUMENTS

| | | | |
|---|---|---|---|
| 3,878,373 | 4/1975 | Blum | 364/414 |
| 3,936,636 | 2/1976 | Percival | 250/445 T |
| 3,983,399 | 9/1976 | Cox, Jr. et al. | 250/445 T |
| 4,029,963 | 6/1977 | Alvarez et al. | 250/445 T |
| 4,042,811 | 8/1977 | Brunnett et al. | 364/414 |
| 4,117,336 | 9/1978 | Bates | 250/445 T |

*Primary Examiner*—Errol A. Krass
*Attorney, Agent, or Firm*—Finnegan, Henderson, Farabow, Garrett & Dunner

[57] ABSTRACT

In a computed tomography system using radiation, a large number of radiation beams are projected into a selected slice-like sectional portion of a subject to be reconstructed, in various directions. A profile of measured projection data is obtained from the radiation beams penetrated in parallel at each given angular interval. The profile of measured projection data thus obtained is subjected to a filtering operation to produce profiles of first modified projection data. The profile of modified projection data is recasted at properly selected intervals to produce second modified projection data. This results in a remarkable reduction of the amount of weight coefficients required in an interpolation to calculate the modified projection data for a large number of picture elements defined in matrix fashion on the sectional portion.

5 Claims, 10 Drawing Figures

COMPUTED TOMOGRAPHY USING RADIATION

The present invention relates to a computed tomography system using radiation.

Tomography systems using radiation, which are well known, calculates an original image, or a picture, i.e., a distribution of radiation absorption coefficients defining a slice-like sectional portion or a sectional area of a subject to be reconstructed, in such a manner that radiation beams are projected into the sectional portion in parallel with the plane and in various directions and the picture is calculated on the basis of the measured projection data thus obtained including a lot of information relating to the image of the selected sectional portion. In this type apparatus, many calculation methods for reproducing an original image of the sectional portion from the measured projection data thereof have been known and one of them is disclosed in the Japanese patent application publication No. 28385/75. Excellent methods are known to be the convolution method and the filtered back-projection method. Both methods are basically common in (1) a modifying operation to obtain modified projection data or filtered projection data by the filtering of the measured projection data in order to improve poor image definition and (2) a back-projection operation for calculating the original image of the sectional portion by back-projecting based on the modified projection data. The modifying operation and the back-projection operation (both operations will be collectively referred to as the original image reconstruction operation for the sake of simplicity) are usually executed by using a digital computer or a special computer operable at a high speed.

As a result, all the data used in the above operations are sampled data. Necessary sampled data to execute the original image reconstruction operation are obtained by detecting numerous radiation beams, which beams are projected parallel at given sampling intervals at each specified sampling angular interval in the range of angles generally from 0° to $\pi$. The intensity of each radiation beam penetrating the sectional portion is detected and converted to a logarithmic value which value is referred to as a sampled projection data or measured projection data value. A set of the sampled projection data values at each angular sampling position is referred to as a profile of sampled projection data.

A distribution of the radiation absorption coefficients of the sectional portion, i.e. the original image of the sectional portion, is obtained by calculating the distribution of the radiation absorption coefficients of a large number of picture elements which are defined by segmenting the sectional portion in matrix fashion. In order to reconstruct the original image, or the picture from the projection data, it is necessary to obtain the sampled projection data from the radiation beams passing through the respective elements in various directions. However, the sampled projection data values are discrete values and the picture elements are discretely arranged. Therefore, it is very difficult to obtain the radiation beam exactly passing through a desired picture element, and thus to obtain the sampled projection data passing through the picture element. To overcome this difficulty, in a conventional data processing system, the sampled projection data is first subjected to the filtering operation for enhancing definition of the picture to calculate the sampled modified projection data or filtered projection data; then the sampled modified projection data representing the radiation passing through the picture elements is calculated from the sampled modified projection data resulting from the filtering operation, by using an interpolation.

In the conventional original image reconstruction method, the weight coefficients necessary for the interpolation operation are calculated for each sampling angular position and each picture element. Accordingly, the operation is cumbersome and extremely time consuming.

Accordingly, an object of the invention is to provide a computed tomography system capable of high speed reconstruction of an original image of the desired sectional portion of a subject to be reconstructed.

To achieve the object mentioned above, the tomographic system according to this invention comprises means for transmitting a large number of radiation beams through a selected slice-like sectional portion of a subject to be reconstructed including a given plane of the subject, substantially in parallel with said plane; detecting means for receiving each radiation beam transmitted through said sectional portion and generating output signals; means for obtaining from said output signals a profile of projection data based on a set of measured radiation beams transmitted parallel through said sectional portion at first sampling intervals $\Delta X_1$ substantially at each specified sampling angular interval; means for obtaining a first profile of modified projection data by subjecting said profile of measured projection data to a specified filtering function; means for computing from said first profile of modified projection data a second profile of modified projection data sampled at second sampling intervals $\Delta X_2$ determined corresponding to said specified sampling angular interval; means for obtaining interpolated projection data from said second profile of modified projection data corresponding to the respective picture elements formed by segmenting said sectional portion in matrix fashion; means for computing by a back-projection operation an original image of said sectional portion from the interpolated projection data for the respective picture element.

When modified projection data are calculated by means of interpolation from the profile of recast projection data the required calculations may be considerably reduced by properly selecting the second sampling interval which is determined with respect to the pitch of the picture element arrangement and penetration direction of the radiation beam. Accordingly, the time taken for the image reconstruction is remarkably reduced.

According to a preferred embodiment, when the second sampling interval is designated by $\Delta X_2$, the pitch in the picture element arrangement by $\Delta$, a projection angle $\theta_k$ calculated by substracting $\pi/2$ from the angle defined by the direction in which a radiation beam is transmitted or penetrates and the direction in which the rows of matrix arrangement extend by $\theta_k$ and such a positive integer as n makes $\Delta X_2$ and $\Delta X_1$ equal and as is specific to a given value of $\theta_k$, the second sampling intervals $\Delta X_2$ is calculated as follows:

When $0 \leq \theta_k < \frac{\pi}{4}$ or $\frac{3}{4}\pi \leq \theta_k < \pi$, $$\Delta X_2 = \frac{\Delta \cdot \cos \theta_k}{n}$$

When $\frac{\pi}{4} \leq \theta_k < \frac{3}{4}\pi$,

-continued
$$\Delta X_2 = \frac{\Delta \cdot \sin \theta_k}{n}.$$

With the selection of the second sampling interval $\Delta X_2$, when the sampled modified projection data resulting from the radiation beams passing through a particular picture element is calculated by means of interpolation from the second modified projection data resulting from the radiation beams traveling parallel both sides of the radiation beams passing through the picture elements, the weight coefficients required for the interpolation operation are all equal for the following picture elements respectively; (a) picture elements arranged on x-axis ($\theta_k = 0$) of Cartesian coodinates fixed on an original image, when $0 \leq \theta_k < \pi/4$ or $\frac{3}{4}\pi \leq \theta_k < \pi$; (b) picture elements arranged on lines parallel to the x-axis when $0 \leq \theta_k < \pi/4$ or $\frac{3}{4}\pi \leq \theta_k < \pi$; (c) picture elements arranged on the y-axis when $\pi/4 \leq \theta_k < \frac{3}{4}\pi$; (d) picture elements arranged on lines parallel to the y-axis when $\pi/4 \leq \theta_k < \frac{3}{4}\pi$.

As a result, the amount of calculations of the sampled modified projection data required for all the picture elements is considerably reduced.

As mentioned above, the original image reconstruction method makes it possible to speed up the back-projection operation by sampling the first modified projection data at the second sampling interval. However, the following data processing methods may also shorten the operation time of the entire system. The first is to use a special apparatus operable at a high speed for the filtering operation, e.g. a convolver. The convolver is capable of vector operation at a high speed and thus is suitable for an operation in which the operation to obtain a scalar product of vectors is repeated, such as a convolution operation. The interpolation operation to calculate the interpolated projection data relating to the respective picture elements by using the second sampled modified projection data, the operation for calculation of the weight coefficients, and the operation for adding into the memory the interpolated projection data thus calculated as the corresponding data for picture elements are substantially the same as the filtering operation conducted by the special apparatus. Accordingly, when the special apparatus is applied to the filtering operation, and the interpolation operation and the addition operation, the time required for these operations is considerably shortened and therefore the efficiency of the entire apparatus is remarkably improved.

Other objects and features of the invention will be apparent from the following description taken in connection with the accompanying drawings, in which.

Like a conventional computed tomography system using radiation, the system of this invention operates in such a manner that, a number of radiation beams (X-ray beams in this embodiment) are projected into a sectional portion of a subject in various directions. The intensities of the radiation beams projected in a given direction are measured and the projection data based on the measurement data i.e. measured projection data are collected in many directions. Each profile of measured projection data is subjected to a filtering operation to produce a first profile of modified projection data. The measurement and the filtering operations are well known and will be briefly referred to.

Figure 1:
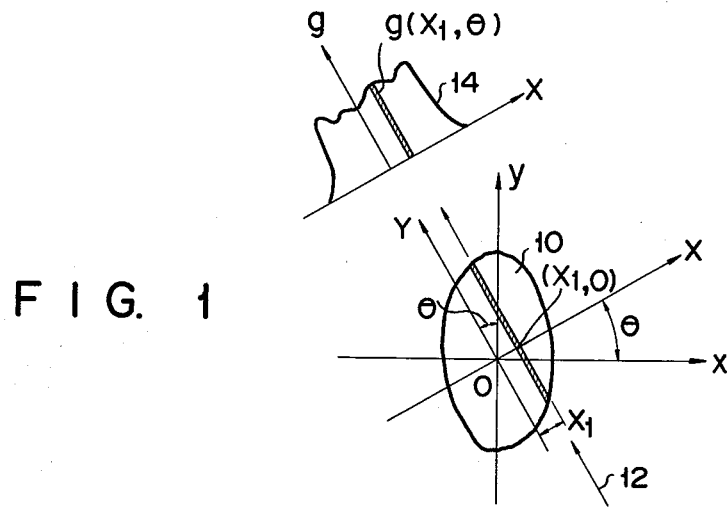
FIG. 1 shows a principle for forming sampled projection data and a profile of projection data by using radiation beams.

In FIG. 1, reference numeral 10 designates a thin slice-like sectional portion of the subject, the portion including a section or a plane across the subject. In the figure, two orthogonal coordinate systems each having the origin O are used; one is an x-y coordinate system and the other is an X-Y coordinate system corresponding to the x-y coordinate system rotated counterclockwise around the origin O by an angle $\theta$. Denoted by reference numeral 12 is a radiation beam penetrating in a direction parallel with the section at a given first sampling interval in the direction as indicated by an arrow, i.e. in the Y-axis direction turned by the angle $\theta$ from the y-axis. The radiation beam 12 passes through the point ($X_1$, O) on the X-axis. Such a set of parallel radiation beams is formed by using parallel beams; however, it may be formed in other suitable manners. In one alternative form, radiation beams projected in a fan-shaped fashion to the sectional portion of the subject are turned around the sectional portion. The turning of the radiation beams is stopped at given angular intervals to be detected or measured. In this case, the angle by which the direction of the radiation beams is measured with respect to O-X axis is shown in FIG. 1 and is called "scan angle". The measured projection data thus discretely collected are inputted into a computer where a set of radiation beams passing substantially parallel with one another through the sectional portion in a given direction at a given interval is selected at each given angular direction. The angle defined by the O-X axis shown in FIG. 1 and the direction in which the radiation beams are transmitted parallel to one another is called the "projection angle" or "sampling angle". This selection is executed by using interpolation if desired. See FIG. 5. The same data processing steps succeeding to this step are applicable for both the methods.

The intensity of the radiation beam, e.g. X-ray beam, denoted by reference numeral 12 is detected after penetration through the sectional portion 10 by a detector 22 (FIG. 5) and the detected intensity is converted into the corresponding logarithmic value by a suitable electronic circuit. The logarithmic value is a sampled projection data value $g(X_1, \theta)$ and is depicted as $g(X_1, \theta)$ on the profile curve 14 shown on an X-g coordinate system in FIG. 1. The sampled projection data values relating to the X-ray beams parallel to the X-ray beam 12 would be shown by a number of bars disposed at first sampling intervals and in parallel with the value $g(X_1, \theta)$. However, such sampled projection data are shown by a continuous curve 14 representing an envelope or a profile connecting the top ends of the bars, for simplicity. A set of the sampled projection data designated by 14 is a profile of projection data relating to the angle $\theta$ and is generally expressed by $g(X, \theta)$.

In order to reconstruct the original image, i.e. the picture, of the sectional portion, it is necessary to obtain a profile $g(X, \theta)$ for each sampling position or each projection direction disposed at a different angular interval, wherein each angle $\theta$ is selected within the range from O to $\pi$.

Figure 2:
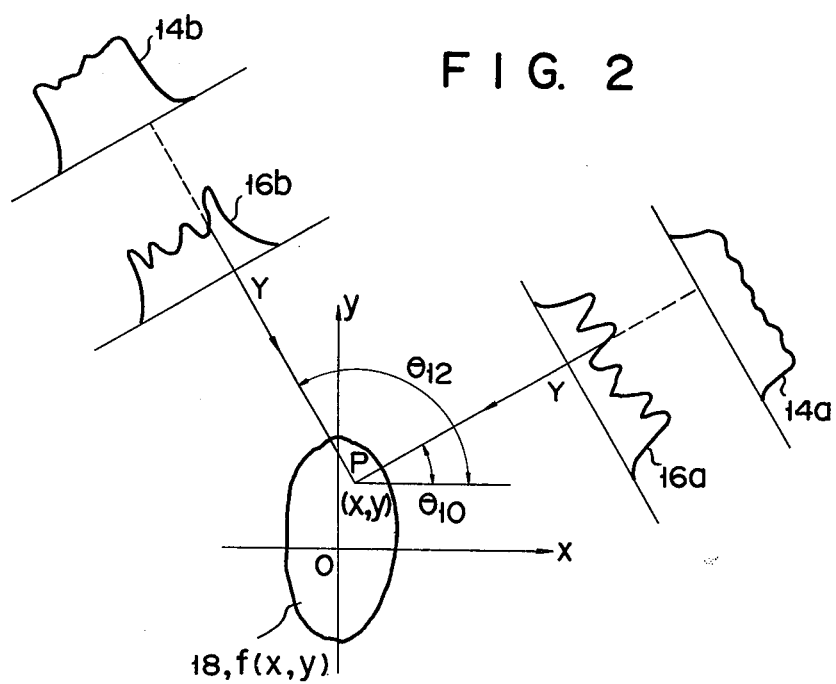
FIG. 2 shows a principle for reconstructing an original image of a sectional portion of an object from the profiles of modified projection data.

FIG. 2 is used to explain the principle for reconstructing the original image of the sectional portion 10. In the figure, among numerous profiles of sampled projection data, two profiles 14a and 14b are illustrated by way of example; the former is collected at the projection angular position in which the radiation beams penetrate the sectional portion in the direction of the Y-axis which is displaced by $\theta_{10}$ from the X-axis and is expressed by $g[X, \theta_{10}-(\pi/2)]$, and similarly the latter is expressed by $g[X, \theta_{12}-(\pi/2)]$. The profiles 14a and 14b are subjected to the well-known filtering operation to calculate profiles of first modified projection data 16a and 16b which are expressed by $q[X, \theta_{10}-(\pi/2)]$ and $q[X, \theta_{12}-(\pi/2)]$, respectively. Each of the profile first modified projection data consists of a first sampled modified projection data or filtered projection data sampled at a first sampling interval. Then, by means of a back projection operation, the X-ray absorption coefficients of the picture elements forming the original image 18 shown in FIG. 2 are calculated from the profiles of the first modified projection data $q(X, \theta)$ with respect to many angles $\theta$. As previously referred to, a distribution of the X-ray absorption coefficients represents the original image, or the picture. The coordinates of the picture elements are expressed generally by (x,y). In FIG. 2, one picture element P at (x,y) is illustrated for simplicity. The filtering operation is performed in accordance with the following equation.

$$q(X,\theta) = \int_{-\infty}^{\infty} |\omega| \cdot H(\omega) \cdot G(\omega,\theta) e^{-2\pi i X \omega} d\omega \quad (1)$$

$$\text{where } G(\omega,\theta) = \int_{-\infty}^{\infty} g(X,\theta) e^{2\pi i X \omega} dX$$

and $|\omega| \cdot H(\omega)$ is the filter function in a Fourier region.

The filtering operation can also be expressed by the following equation $$q(X,\theta) = \int_{-\infty}^{\infty} g(X - X',\theta) \cdot h(X') dX' \quad (2)$$

$$\text{where } h(X') = \int_{-\infty}^{\infty} |\omega| \cdot H(\omega) e^{-2\pi i X \omega} d\omega.$$

Equation (1) corresponds to the filtering process in the filtered back-projection method and equation (2) to that in the convolution method. In the above equations (1) and (2), $\omega$ and $X'$ are integration variables introduced into the integrating operations.

The back-projection operation for getting the original image or picture data is performed by the following equation.

$$f(x,y) = \int_{0}^{\pi} q(x\cos\theta + y\sin\theta, \theta) d\theta \quad (3)$$

In general, the reconstruction operation of the original image is discretely conducted by using a digital computer or a special calculator operable at a high speed.

The sampling operation for the original image reconstruction will be described referring to FIG. 3. As shown, a number of sampling points are disposed on the X-axis of an X-Y coordinate system rotated by $\theta_k$ from the x-y coordinate system. The X-ray beams penetrating through the sectional portions progress in the Y-axis direction through these sampling points, for example, $(X_{l-1},\theta_k)$, $(X_l,\theta_k)$, $(X_{l+1},\theta_k)$ ... $(X_{l+3},\theta_k)$. $X_l$ and $\Delta X_1$ are related by the equation (4), wherein $\Delta X_1$ is the sampling interval, i.e. first sampling interval.

$$X_l = l \cdot \Delta X_1, \theta_k = k \cdot \Delta \theta \quad (4)$$

Thus, $g(X_l,\theta_k)$ can be written in the form of $g(l \cdot \Delta X_1, \theta_k)$. In the above relations, l is 0 or a negative or positive integer, k is 0 or a positive integer, 0, 1, 2, ... $N_\theta$ and $\Delta\theta$ is a sampling angular interval of the angle $\theta$ defining the direction of the X-axis.

The original image, or the picture, i.e. f(x,y) of the sectional portion of the subject, is also expressed by a discrete value $f(i\Delta, j\Delta)$. Here, $\Delta$ designates the pitch in the picture element arrangement formed by segmenting the original image in matrix fashion in the x- and y-directions; i and j indicate an integer within the range from $-N$ to $+N$. Therefore, the equation (3) can be rewritten in the form $$f(i\Delta, j\Delta) = \sum_{k=0}^{N_\theta} q(i\Delta \cdot \cos\theta_k + j\Delta \cdot \sin\theta_k, \theta_k) \Delta\theta \quad (5)$$

In the above equaton, if X is given $$X = i\Delta \cdot \cos\theta_k + j\Delta \cdot \sin\theta_k \quad (6)$$

the X in (6) (for example, one length of X is indicated by $X_{Q1}$ in FIG. 3) is not coincident with the $X_l$. In FIG. 3, $P_1$ and $P_2$ designate two picture elements adjacently disposed on the line parallel with the x-axis and are expressed by coordinates $(i\Delta, j\Delta)$ and $((i+1)\Delta, j\Delta)$. Points $Q_1$ and $Q_2$ are feet of the perpendiculars from the points $P_1$ and $P_2$ to the X-axis, respectively. The points $Q_1$ and $Q_2$ generally do not coincide with the point $(X_l, \theta_k)$, because the point $(X_l,\theta_k)$ is generally selected independently from the points $P_1$ and $P_2$. To calculate the radiation absorption coefficients of the picture element $P_1$ or $P_2$, it is necessary to obtain the sampled modified projection data i.e. interpolated projection data, by the radiation beam which penetrates through the point $Q_1$ or $Q_2$, accordingly the point $P_1$ or $P_2$, in the Y-axis direction. However, such data does not exist in fact. For this, the interpolated projection data at the point $Q_1$, for example, is calculated from the first sampled modified projection data at the points $(X_l,\theta_k)$ and $(X_{l+1},\theta_k)$ by an interpolation. The interpolation projection data for the point $Q_2$ is calculated from the first sampled modified projection data at the points $(X_{l+2},\theta_k)$ and $(X_{l+3},\theta_k)$. Many interpolation methods may be used in this case. In this example, the linear interpolation widely used will be employed for calculating the interpolated projection data at the points $Q_1$ and $Q_2$. First, the first sampled modified projection data relating to the points $(X_l,\theta_k)$ and $(X_{l+1},\theta_k)$ are expressed by $q(X_l,\theta_k)$ and $q(X_{l+1},\theta_k)$, respectively. Then, weight coefficients $\omega_{2l}$ and $\omega_{1l}$ to be multiplied by the values $q(X_l,\theta_k)$ and $q(X_{l+1},\theta_k)$, respectively are calculated by the following equations:

$$\omega_{1l} = l + 1 - \frac{\Delta X_{Q1}}{\Delta X_1} \Bigg\}\quad (7)$$

$$\omega_{2l} = \frac{\Delta Q_1}{\Delta X_1} - l$$

where $X_{Q1} = i\Delta \cdot \cos\theta_k + j\Delta \cdot \sin\theta_k$ (8)

$$l = \left[\frac{X_{Q1}}{\Delta X_1}\right]$$

The final equation indicates that the $l$ is smaller than $X_{Q1}/\Delta X_1$ and the nearest integer. The parentheses [ ] hereinafter described indicate the same. With use of the $\omega_{1l}$ and $\omega_{2l}$, the interpolated projection data $q(X_{Q1},\theta_k)$ is given by the following equation:

$$q(X_{Q1},\theta_k) = \omega_{1l}\cdot q(X_l,\theta_k) + \omega_{2l}\cdot q(X_{l+1},\theta_k) \quad (9)$$

The above calculation is executed for each angle $\theta_k$ over all the picture elements to obtain the interpolated projection data relating to the respective sectional portions of the subject.

The above-mentioned interpolation operation is performed at each of the angles $\theta_k$ and for all of the picture elements, thus resulting in many calculations. However, the invention employs a new operation method described below to reduce remarkably the necessary calculations for the interpolation and thus the time taken for the operation is greatly decreased.

In brief, the fundamental principle of the new operation method is such that the second sampled modified projection data or recast projection data $q'(X_m,\theta_k)$ sampled at a second sampling interval $\Delta X_2$ is calculated from the first sampled modified projection data $q(X_l,\theta_k)$ sampled at the first sampling interval $\Delta X_1$ for the angle $\theta_k$. In this case, the envelope of a set of the second sampled modified projection data $q'(X_m,\theta_k)$ for various values of $m$ will collectively be referred to as the profile of the second modified projection data values $q'(X,\theta_k)$.

The second sampling interval, or sampling interval for recasting, $\Delta X_2$ is given by the following equation, relating to the pitch $\Delta$ of the picture elements and the inclination $\theta_k$ of the X axis.

$$\text{When } 0 \leq \theta_k < \frac{\pi}{4} \text{ or } \frac{3}{4}\pi \leq \theta_k < \pi, \Bigg\} \quad (10)$$

$$X_2 = \frac{\Delta \cdot \cos\theta_k}{n}$$

$$\text{When } \frac{\pi}{4} \leq \theta_k < \frac{3}{4}\pi,$$

$$X_2 = \frac{\Delta \cdot \sin\theta_k}{n}$$

Where $n$ is a positive integer and, preferably, is so selected that the first and second sampling intervals $\Delta X_1$ and $\Delta X_2$ are substantially equal to each other.

Figure 4:
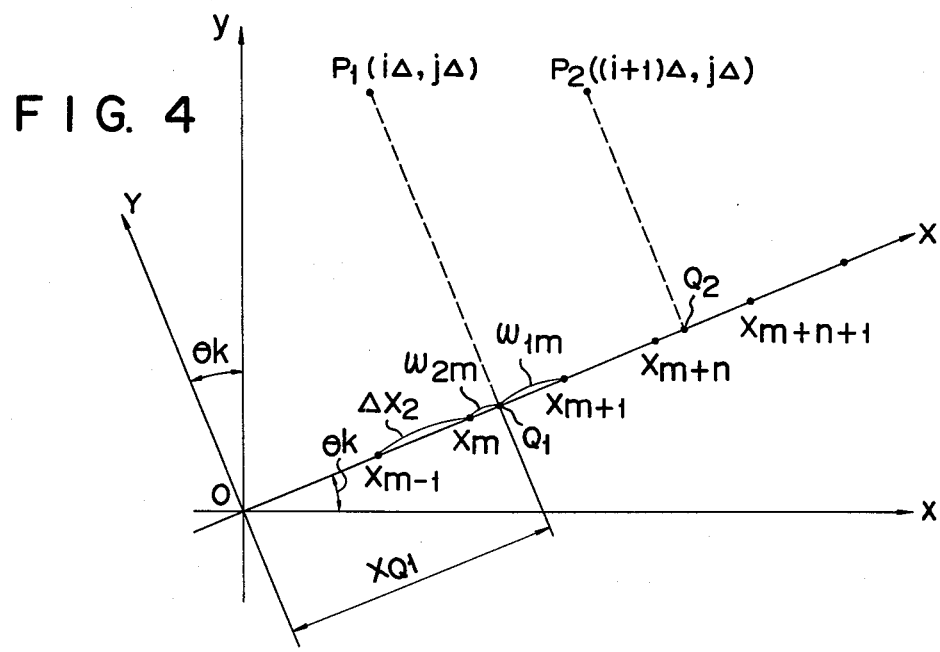

Referring now to FIG. 4, some of the new sampling points are disposed along the X-axis at the second sampling intervals $\Delta X_2$ and are denoted as $(X_m,\theta_k)$, $(X_{m+1},\theta_k)$, $(X_{m+n},\theta_k)$ and $(X_{m+n+1},\theta_k)$. Here, the $X_m$ is selected to have the following relation with the $\Delta X_2$ $$X_m = m\cdot\Delta X_2 \quad (11)$$

where $m$ is 0 or a positive or negative integer. The operation for calculating the second sampled modified projection data $q'(X_m,\theta_k)$, i.e. $q'(m\cdot\Delta X_2,\theta_k)$ from the first sampled projection data $q(\Delta X_l,\theta_k)$ is executed in the same method as the above discribed linear interpolation. Accordingly, the explanation of it will be omitted.

Let us calculate the interpolated projection data values $q'(X_{Q1},\theta_k)$ and $q'(X_{Q2},\theta_k)$ corresponding to points $Q_1$ and $Q_2$ shown in FIG. 4 respectively, from the second sampled modified or recast projection data $q'(X_m,\theta_k)$. The points $Q_1$ and $Q_2$, and points $P_1$ and $P_2$ are the same as those shown in FIG. 3. In order to calculate the interpolated projection data $q'(X_{Q1},\theta_k)$, weight coefficients $\omega_{1m}$ and $\omega_{2m}$ to be multiplied by the second sampled modified projection data $q'(X_m,\theta_k)$ and $q'(X_{m+1},\theta_k)$ will be calculated by the following equations:

$$\omega_{1m} = m + 1 - \frac{X_{Q1}}{\Delta X_2} \Bigg\} \quad (12)$$

$$= [nj\cdot\tan\theta_k] + 1 = nj\cdot\tan\theta_k$$

$$\omega_{2m} = \frac{X_{Q1}}{\Delta X_2} - m$$

$$= nj\cdot\tan\theta_k - [nj\cdot\tan\theta_k]$$

where $X_{Q1} = i\Delta\cdot\cos\theta_k + j\Delta\cdot\sin\theta_k$ $$m = \left[\frac{X_{Q1}}{\Delta X_2}\right] = nj + [nj\cdot\tan\theta_k] \quad (13)$$

As seen from equation (12), $\omega_{1m}$ and $\omega_{2m}$ depend on $\theta_k$ and $j$ and not $i$. Accordingly, the interpolated projection data $q'(X_{Q1},\theta_k)$ for the point $P_1(i\Delta,j\Delta)$ (simply expressed $\alpha(i)$) is given $$\alpha(i) = \omega_{1m}\cdot q'(X_m,\theta_k) + \omega_{2m}\cdot q'(X_{m+1},\theta_k) \quad (14)$$

The interpolated projection data $q'(X_{Q2},\theta_k)$ for the point $P_2((i+1)\Delta,j\Delta)$ (simply expressed $\alpha(i+1)$ is given $$\alpha(i+1) = \omega_{1m}\cdot q'(X_{m+n},\theta_k) + \omega_{2m}\cdot q'(X_{m+n+1},\theta_k)$$

Thus, for the picture elements disposed along the j line expressed by $y = j\Delta$, the interpolation may be executed by using the same weight coefficients $\omega_{1m}$ and $\omega_{2m}$. As a result, it is sufficient to calculation only the weight coefficients corresponding to the number of the line $j$. Consequently, when the second modified projection data is calculated through the change of $i$ from $-N$ to $+N$ at each value of $j$ being changed from $-N$ to $+N$, the $(2N+1)$ operations may be executed by using the same weight coefficients. For this, it is unnecessary to calculate the weight coefficients for the $(2N+1)^2$ picture elements defining the entire area, unlike the conventional operation. Therefore, the calculation of the interpolated projection data for all the picture elements, i.e. the reconstruction of the original image of the sectional portion, or the picture thereof, is performed in reduced time. The operation shown in the equation (14) is the convolution operation and can be rapidly conducted by using the special operation apparatus.

Figure 5:
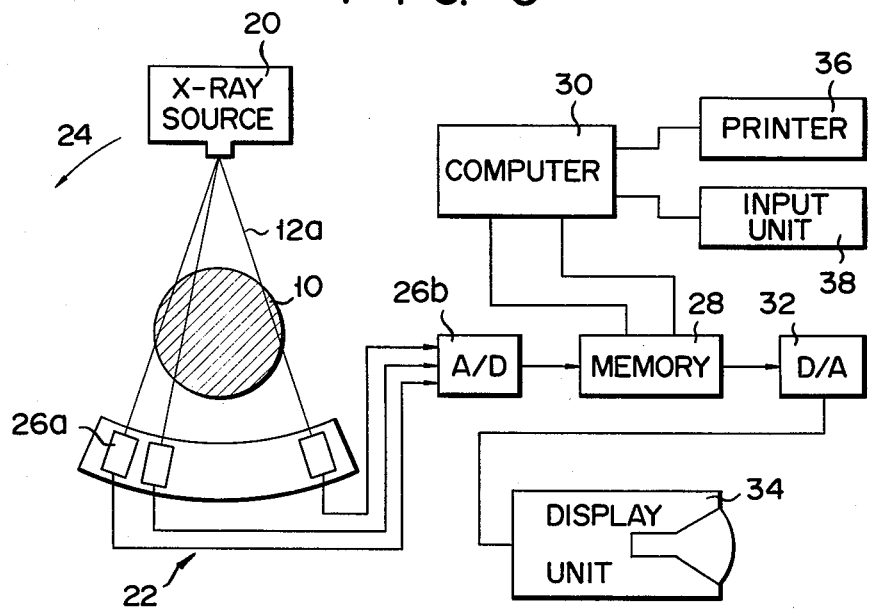
FIG. 5 shows in block form a basic construction of an embodiment of the invention.

FIG. 5 shows a block diagram of an embodiment of the computed tomography apparatus according to the invention. An X-ray source 20 projects a number of X-ray beams 12a, for example, an R number of beams, into the sectional portion 10 of a subject. The X-ray beams penetrating through the sectional portion 10 are intensity-detected, after penetration, by a detecting means such as a detector 22. The detector 22 comprises detector elements 26a and an A-D converter 26b. The number of the detector elements 26a corresponds to that of the X-ray beams 12a. Upon receipt of the X-ray beams, the detector elements 26a produce analogue electrical signals which in turn are converted into digital signals through an A/D converter. The digital signals from the AD converter 26b are stored in a memory unit 28.

The detector elements 26a and the X-ray source 20 are turned around the sectional portion 10 in the direction of arrow 24. The above-mentioned measuring is performed at each given angular position or scan angle.

The digital signals stored in the memory 28 are converted into the corresponding logarithmic values by a computer 30, and then again loaded into the memory 28. Each logarithmic value represents the sampled projection data including the information relating to the X-ray absorption coefficient distribution along a path through which the X-ray beam penetrates the sectional portion 10. Various sampled projection data thus obtained are classified into data groups each including data with respect to X-ray beams of R number penetrating in a given angular direction, which direction is changed for each given angular interval. As a result, a profile of the sampled projection data relating to each projection angle $\theta$ (FIG. 1) is formed. The classification is performed by computer 30 and the result is again stored in the memory 28. In FIG. 1, reference numeral 14 designates the profile of the sampled projection data $g(X,\theta)$ and $g(X_1,\theta)$ expresses the sampled projection data.

The memory 28 comprises a program part of the computer 30 adapted to store the profile of the sampled projection data $g(X,\theta)$, a filter function $h(X)$ memory part (the filter function $h(X)$ being composed of discrete values corresponding to $g(X,\theta)$), and a picture reconstruction memory part, etc. The computer 30 performs the filtering operation and the image reconstruction operation by given programs and stores the data representing the reconstructed image into the memory 28. The image-reconstruction data stored in the memory is read out therefrom when necessary and converted into analogue signals. The signals are then applied to a display unit 34 and visualized. The image reconstruction data and other data are read out from the memory 28 by the computer 30 may also be printed out by a printer 36. In the figure, an input unit 38 is shown connected to the computer.

Figure 6:
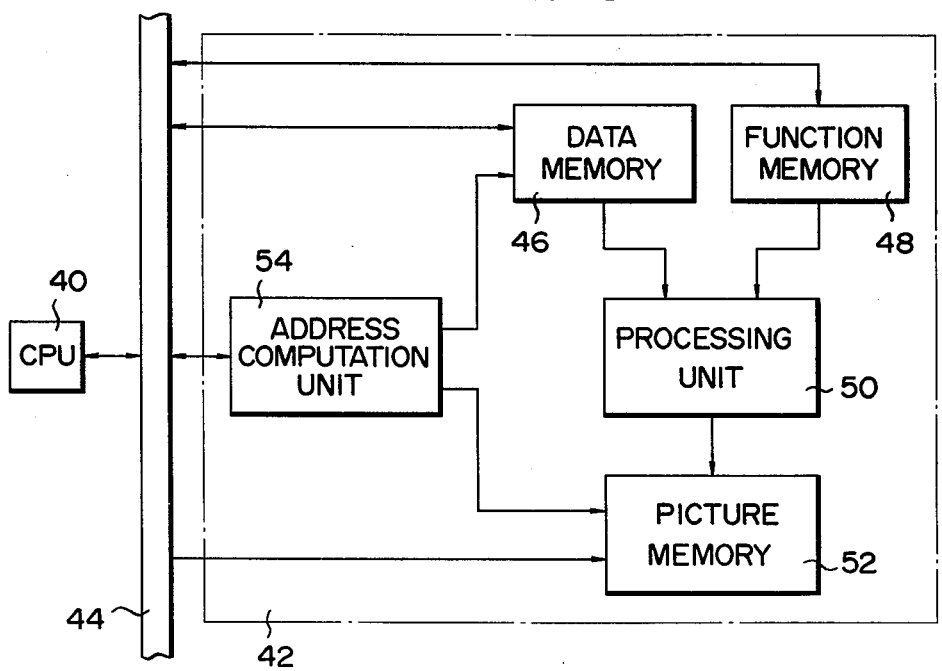
FIG. 6 is a block diagram of the part for performing an original image reconstruction operation in the embodiment shown in FIG. 5.

FIG. 6 illustrates in greater detail the memory 28 and the computer 30 shown in FIG. 5. The circuit is so designed as to permit high speed processing of the filtering operation and the interpolation operation. In the figure, reference numeral 40 designates a central processing unit (CPU) of a minicomputer used for a computer 30 in FIG. 5, numeral 42 designates a special apparatus or special arithmetic unit, and numeral 44 is a bus permitting data transmission between the CPU 40 and the arithmetic unit 42. The arithmetic unit 42 includes a data memory 46, a function memory 48, a processing unit 50, a picture memory 52 and an address computation unit 54. The processing unit 50 is used for executing the filtering operation, and usually is constructed by multipliers and adders. For this arithmetic unit, a so-called convolver, exclusively used for a convolution processing, may be used.

Figure 7:
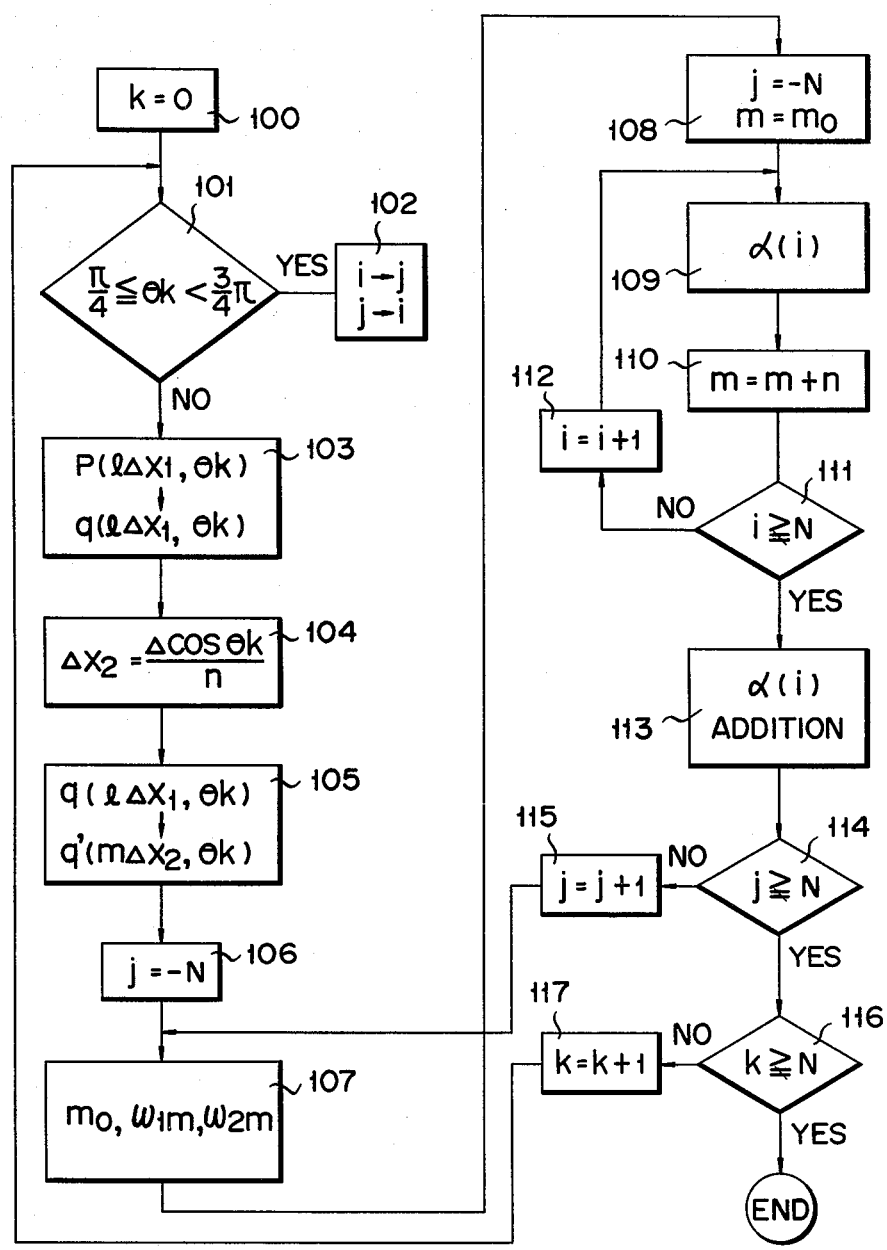
FIG. 7 illustrates a flow chart for generally illustrating the original image reconstruction operation.
Figure 8A:
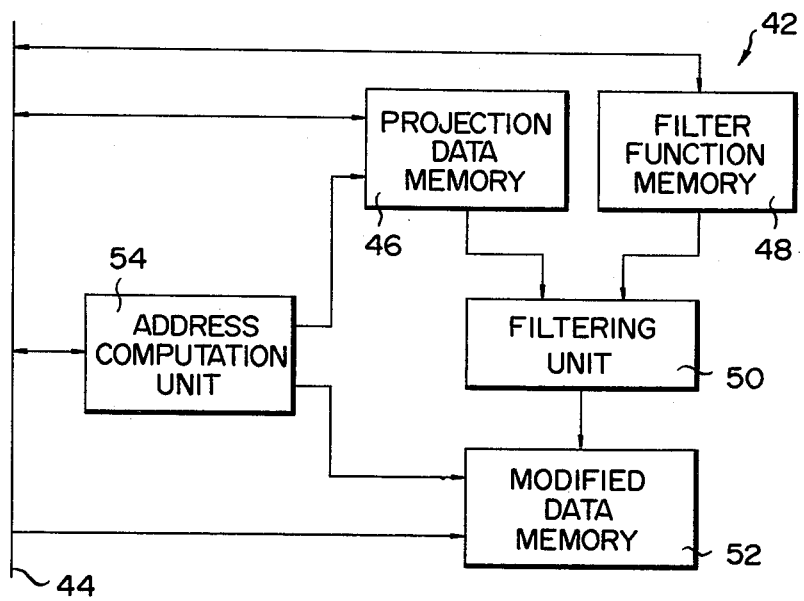
FIGS. 8a, 8b and 8c show operations of a special operation unit shown in FIG. 6.
Figure 8B:
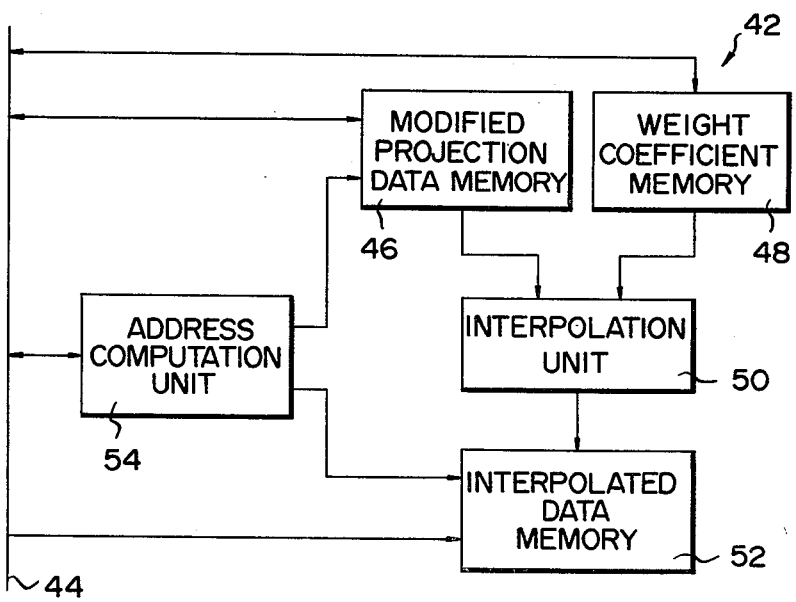
Figure 8C:
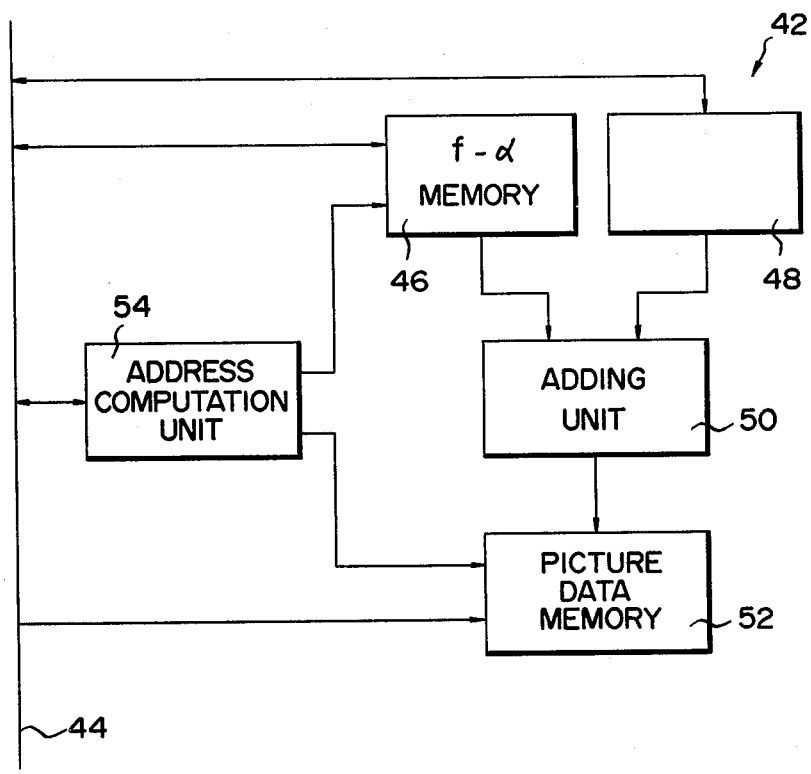

The operation of the arithmetic unit 42 shown in FIG. 6 and the data processing flow from the filtering operation to the back projection operation will be described referring to the drawings of FIG. 8a, FIG. 8b, FIG. 8c and FIG. 7. FIG. 8a to FIG. 8c illustrate different operation modes of the arithmetic unit 42. FIG. 8a illustrates the case of the filtering operation performed by the arithmetic unit 42. In this case, the data memory 46, function memory 48, processing unit 50 and picture memory 52 are used as a projection data memory, filter function memory, filtering unit, and first modified projection data memory, respectively. In the filtering operation, the sampled projection data values $g(l\cdot\Delta X_1,\theta_k)$ collected at first sampling intervals $\Delta X_1$ and the filter function are stored in the projection data memory 46 and the filter function memory 48, respectively. Through the operation of the address computation unit 54, the sampled projection data and the filter function at the respective sampling points are supplied to the filtering unit 50 where the filtering operation is carried out. The result of the filtering operation which is the first sampled modified projection data $q(l\cdot\Delta X_1,\theta_k)$, accordingly the profile of the first sampled modified projection data $q(X,\theta_k)$ is supplied to the modified projection data memory 52. As will be described in the order of processes indicated in FIG. 7, the second sampling interval $\Delta X_2$ is calculated in accordance with the equation (10) by the CPU 40. In this case, the value of n is inputted by an operator. Then, the CPU 40 calculates the second sampled modified projection data $q'(m\cdot\Delta X_2,\theta_k)$ sampled at interval $\Delta X_2$ from the first sampled modified projection data $q(l\cdot\Delta X_1,\theta_k)$, calculates the weight coefficients $\omega_{1m}$ and $\omega_{2m}$ shown in the equation (12) by using the n and the angular data $\theta_k$, and further computes the X-coordinate of the foot $m_0$ (not shown) of the perpendicular from a picture element (not shown) located at the left end of j line given by $y=j\Delta$ to the X-axis.

Then, the arithmetic unit 42 executes, executes from the second modified projection data $q'(m\Delta X_2,\theta_k)$, as shown in FIG. 8b, the interpolation operation for calculating the interpolated projection data $q'(X_Q,\theta_k)$, i.e. the interpolation value $\alpha(i)$, which should be obtained from each of the X-ray beams passing the respective picture elements of the sectional portion. In this case, the data memory 46, function memory 48, processing unit 50 and picture memory 52 operate as the second sampled modified projection data memory, weight coefficient memory, interpolation unit, and interpolated modified projection data memory, the memory 46 and the weight coefficient memory 48 store the second sampled modified projection data $q'(m\cdot\Delta X_2,\theta_k)$ and the weight coefficients $\omega_{1m}$ and $\omega_{2m}$, respectively. The address computation unit 54 receives signals m and $m_0$ transferred from the CPU 40 and successively reads out second sampled modified projection data and the weight coefficients $\omega_{1m}$ and $\omega_{2m}$ from the memories 46 and 48 and supplies the readout values to the interpolation unit 50. The interpolation unit 50 calculates the interpolation values i.e. data for back projection $\alpha(i)$ defined by the equation (14), then the interpolation value is stored in the interpolated data memory 52 in response to an instruction signal issued from the address computation unit 54. The interpolation operation may be performed by the CPU 40. This operation is substantially the same as the filtering operation so that it can be performed at a high speed by using this arithmetic unit 42.

Thus the calculated interpolation value $\alpha(i)$ is the interpolated modified projection data relating to the picture element located at the point $(i\Delta,j\Delta)$ of the sectional portion and is added into the data of $f(i\Delta,j\Delta)$ as shown in FIG. 8c. The interpolation values $\alpha(i)$ of all the picture elements $(i\Delta,j\Delta)$ are calculated and the calculated interpolation values are added into the data of $f(i\Delta,j\Delta)$ to reconstruct the picture of the sectional portion. This operation may be performed by the CPU 40 and also the arithmetic unit 42.

In the operation mode shown in FIG. 8c, the arithmetic unit 42 operates to add the interpolation value into the original image data, i.e. the picture data of $f(i\Delta,j\Delta)$. In this mode, the data memory 46, processing unit 50 and picture memory 52 are used as $f-\alpha$ memory for storing picture data $f(i\Delta,j\Delta)$ and interpolation value $\alpha(i)$, adding unit and picture data memory, respectively. In this case, the function memory 48 is not used and therefore the block 48 is blanked in FIG. 8c. In FIG. 8c, the picture data $f(i\Delta,j\Delta)$ and the interpolation value $\alpha(i)$ are stored in the $f-\alpha$ memory 46. The adding unit 50 successively receives the picture data $f(i\Delta,j\Delta)$ and the interpolation value $\alpha(i)$ from the memory 46 by the signals from the address computation unit and adds the interpolation value $\alpha(i)$ into the corresponding picture data $f(i\Delta,j\Delta)$, then the result of the addition is stored in the memory 52. In this manner, when the arithmetic unit 42 is used for adding of the interpolation value, the adding operation may be performed at a high speed and thus the image may also be reconstructed at a high speed.

The data processing steps from the filtering operation to the back-projection operation will be described with reference to FIG. 7.

Figure 3:
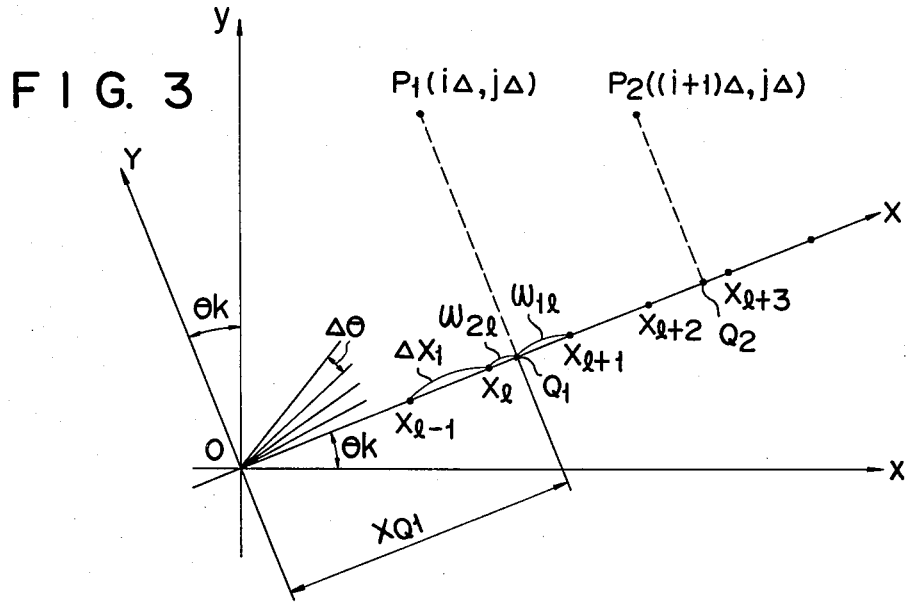
FIGS. 3 and 4 illustrate relations among the sampling positions at first and second sampling intervals, picture elements and weight coefficients.

In the figure, reference numeral 100 designates a step to set the arithmetic circuit to the state $k=0$ so that the operation initiates from the time point where the X- and x-axis are coincident in FIG. 3. A step 101 selects one of two equations according to the value $\theta_k$ whereupon the second sampling interval $\Delta X_2$ is calculated. A step 103 calculates the first sampled modified projection data $q(l \cdot \Delta X_1, \theta_k)$ from the sampled projection data $g(l \cdot \Delta X_1, \theta_k)$. A step 104 calculates the second sampling interval $\Delta X_2$ in accordance with equation (10) by using CPU 40, with a given n. A step 105 calculates the second sampled modified projection data $q'(m \cdot \Delta X_2, \theta_k)$ from the first sampled modified projection data $q(l \cdot \Delta X_1, \theta_k)$. A step 106 sets the arithmetic unit 42 to $j = -N$ in order to calculate the weight coefficients of the picture elements disposed along the j line (i.e. $y = j\Delta$ line) from $y = -N\Delta$ line to $y = +N\Delta$ line. A step 107 calculates the X-coordinate at the foot $m_0$ of the perpendicular from the point $x = -N\Delta$ and $y = +j\Delta$ to the X-axis and the weight coefficients $\omega_{1m}$ and $\omega_{2m}$ in accordance with the equation (12) by using the values of designated n and the angle $\theta_k$, by means of the CPU 40. A step 108 causes the step 109 and succeeding ones to initiate from $i = -N$, $m = m_0$. A step 109 calculates the interpolation value $\alpha(i)$ in accordance with the equation (14). A step 110 changes m into $m+n$ in order that the $\alpha(i)$ operation having been conducted for the point $Q_1$ is shifted to that for the point $Q_2$. A step 111 causes steps 109 and 110 to be repeated after the i is changed to $i+1$ by the step 112 when i is other than $i \gtrless N$, and shifts to the step 113 when $i \gtrless N$. Step 113 adds the interpolation value $\alpha(i)$ into the picture data $f(i\Delta,j\Delta)$. A step 114 shifts to the next step 116 when $j \gtrless N$, and repeats step 107 and succeeding steps after i is changed to $j+1$ by step 115 when j is other than $j \gtrless N$. A step 116 completes the calculation of the interpolation value for the respective picture elements of the sectional portion of the subject and the addition when $k \gtrless N_\theta$, and repeats step 101 and succeeding steps after k is changed to $k+1$ when k is other than $k \gtrless N$.

The calculation of the second sampled modified projection data $q'(m \cdot \Delta X_2, \theta_k)$ from the first sampled modified projection data $q(l \cdot \Delta X_1, \theta_k)$ through the changing of the sampling interval in the step 105 is performed in the same manner as the interpolated projection data relating to the points $Q_1$ and $Q_2$ and thus $P_1$ and $P_2$ in FIG. 4 are calculated from the second sampled modified projection data through linear interpolation. Therefore, the elaboration of the calculation of the second sampled modified projection data $q'(m \cdot \Delta X_2, \theta_k)$ will be omitted.

Having described a specific embodiment of the invention, it is believed obvious that modification and variation of the invention is possible in light of the above teachings. The radiation beams penetrating the sectional portion may be arranged in parallel with one another or arranged in fan-shape fashion. A turning movement, a parallel movement and a combination of them are applicable for the movement of the radiation source and the detector. The radiation source may be placed within the subject itself, unlike the above-mentioned embodiment placing the radiation source on the outside of the subject. In place of the change of the sampling method of the modified projection data by the second sampling interval, another method is allowable in which the radiation beams are measured at sampling intervals depending on the penetration direction of the radiation beams, and the modified projection data sampled at the sampling interval are directly used. Further, when the original image is back projected on the basis of the second sampled modified projection data, a higher order interpolation method may be employed. The interpolated projection data obtained in this method are more precise.

What we claim is:

1. A computed tomography system for reconstructing an image of a sectional area of a subject, using picture data about picture elements arranged in a matrix to constitute said sectional area, said system comprising:

means provided with a source of radiation beams for projecting radiation beams which transmit through said sectional area in a direction substantially parallel to the plane of said sectional area;

means for rotating said source of radiation beams about said sectional area so as to project said radiation beams onto said sectional area at various scan angles;

means provided with a plurality of detectors for detecting the radiation beams transmitting from said sectional area so as to generate an output signal which corresponds to each of the radiation beams;

means for obtaining a profile of measured projection data from the output signals which correspond to the radiation beams projected to said sectional area at various scan angles, respectively, said profile of measured projection data comprising a plurality of measured projection data which correspond to the radiation beams transmitted to said sectional area at a plurality of projection angles at first sampling intervals $\Delta X_1$;

means for calculating a profile of filtered projection data for every projection angle by processing each profile of measured projection data with a predetermined filter function;

means for calculating a profile of recast projection data corresponding to said profile of filtered projection data by recasting said profile of filtered projection data, instead of forming a profile of recast projection data, using a plurality of filtered projection data which should be obtained by projecting the radiation beams through said sectional area in a direction determined by said projection angle at second sampling intervals $\Delta X_2$ for recasting which is determined by said projection angle and the pitch length of the picture element arranged in said matrix;

means for calculating interpolated projection data from said profile of recast projection data, using interpolation calculation, instead of from the radiation beams which transmit respectively, through the picture elements of each row of said matrix; and means for carrying out back projection calculation based on said interpolated projection data obtained for every projection angle, thereby obtaining picture data for each picture element and thus reconstructing the image of said sectional area using such picture data.

2. A computed tomography system according to claim 1, in which said second sampling interval $\Delta X_2$ for recasting is determined from the following equations:

when $\theta \leq \theta_k < \frac{\pi}{4}$ or $\frac{3}{4}\pi \leq \theta_k < \pi, \Delta X_2 = \frac{\Delta \cos \theta_k}{n}$, and when $\frac{\pi}{4} \leq \theta_k < \frac{3}{4}\pi, \Delta X_2 = \frac{\Delta \sin \theta_k}{n}$, where $\Delta$: a pitch length of the picture elements arranged in matrix, $\theta_k$: a projection angle, obtained by subtracting $\pi/2$ from the angle defined by the direction in which the radiation beam transmits and the row direction of the matrix of picture element, n: a positive integer so chosen as to make $\Delta X_2$ substantially equal to $\Delta X_1$ and being specific to every value of $\theta_k$.

3. A computed tomography system according to claim 3, in which said means for calculating interpolated projection data calculates, for every projection angle, weight coefficients to apply to said filtered projection data in order to obtain said interpolated projection data about the picture elements constituting each row of said matrix, those of said weight coefficients which concern the picture elements constituting a row of said matrix having common value.

4. A computed tomography system for reconstructing an image of a sectional area of a subject, using picture data accumulated in picture elements arranged in a matrix to constitute said sectional area, said system comprising:

means provided with a source of radiation beams for projecting radiation beams which transmit through said sectional area in a direction substantially parallel to the plane of said sectional area;

means for rotating said source of radiation beams about said sectional area so as to project said radiation beams onto said sectional area at various scan angles;

means provided with a plurality of detectors for detecting the radiation beams transmitting from said sectional area so as to generate an output signal which corresponds to each of the radiation beams;

means for obtaining a profile of measured projection data from said output signals which corresponds to the radiation beams projected to said sectional area at various scan angles, respectively, said profile of measured projection data comprising a plurality of measured projection data values which correspond to the radiation beams transmitted to said sectional area at a plurality of projection angles at first sampling intervals $\Delta X_1$;

a first memory;

a second memory for storing function data to be applied to the data stored in said first memory;

a processing unit for performing convolution calculations according to the data from said first and second memories; and a third memory for storing the output of said processing unit;

said computed tomography system operating in:

a first mode wherein said first memory stores said profile of measured projection data, said second memory stores filter function data to be applied to said profile of measured projection data, said processing unit converts said profile of measured projection data into a profile of filtered projection data, and said third memory stores said profile of filtered projection data;

a second mode wherein said first memory stores said projection of filtered projection data, said second memory stores weight coefficient data to be applied to recast projection data obtained from said profile of filtered projection data, said processing unit generates interpolated projection data based on the filtered projection data and weight coefficient data, using interpolation calculations, each interpolated projection data corresponding to a filtered projection data obtained by projecting radiation beams through one of said picture elements, and said third memory stores all the interpolated projection data; and a third mode wherein said first memory stores said interpolated projection data, said processing unit obtains picture data for each picture element by adding those of the data stored in said first memory which correspond to said picture element, and said third memory stores all the picture data.

5. In a computed tomography system wherein radiation projected through an examination plane within a subject is detected at a plurality of discrete points spaced apart by a fixed predetermined sample interval $\Delta X_1$ at each of a plurality of different angular scan positions relative to a fixed coordinate system superimposed on said plane, wherein projection data values are derived for each of said discrete detection points to provide a radiation detection profile for each scan position, and wherein picture element values are assigned to each of a plurality of picture elements disposed in a fixed matrix superimposed on said plane, said picture element values being derived from said projection data values through interpolation, a method comprising the steps of:

determining a second sampling interval $\Delta X_2$ for each different angular scan position at which said projection data values are derived, said second sampling interval being determined in accordance with the pitch of said picture elements and the angle of said scan position to define a row of secondary radiation sampling points spaced apart from one another by an integral multiple of the distance between the centers of the picture elements of one row of said matrix as said distance is projected at right angles to a line connecting said secondary sampling points;

recasting said projection data values into second projection data values representing a radiation detection profile for said secondary sampling points;

calculating a pair of weight coefficients for each row of picture elements in said matrix;

applying a picture element value to each picture element in said matrix by interpolating the second projection data values adjacent to said element in accordance with the weight coefficients determined for the row in which said element resides;

accumulating picture element values for each element in said matrix by repeating said steps of determining, recasting, calculating, and applying for each of a plurality of different scan positions; and displaying said matrix of accumulated picture element values to provide a tomographic image of said examination plane.

* * * * *

UNITED STATES PATENT AND TRADEMARK OFFICE
CERTIFICATE OF CORRECTION

PATENT NO. : 4,219,876
DATED : August 26, 1980
INVENTOR(S) : Mizutani et al

It is certified that error appears in the above-identified patent and that said Letters Patent are hereby corrected as shown below:

Column 13, line 38, change "3" to --2--.

Signed and Sealed this

Twenty-eighth Day of October 1980

[SEAL]

Attest:

SIDNEY A. DIAMOND

Attesting Officer

Commissioner of Patents and Trademarks